United States Patent
Stewart

(10) Patent No.: US 9,582,288 B1
(45) Date of Patent: Feb. 28, 2017

(54) METHOD FOR INTEGRATING SOFTWARE COMPONENTS INTO A SPREADSHEET APPLICATION

(75) Inventor: James T. Stewart, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 807 days.

(21) Appl. No.: 12/578,101

(22) Filed: Oct. 13, 2009

Related U.S. Application Data

(63) Continuation of application No. 10/414,693, filed on Apr. 16, 2003, now Pat. No. 7,624,372.

(51) Int. Cl.
G06F 9/44 (2006.01)

(52) U.S. Cl.
CPC .................................... G06F 9/44 (2013.01)

(58) Field of Classification Search
CPC ...................................................... G06F 9/44
USPC ................................ 717/113, 110, 111, 114
See application file for complete search history.

(56) References Cited

U.S. PATENT DOCUMENTS

| | | | | |
|---|---|---|---|---|
| 4,989,141 A | * | 1/1991 | Lyons | G06F 17/246 705/30 |
| 5,381,555 A | * | 1/1995 | Brauns et al. | |
| 5,572,652 A | * | 11/1996 | Robusto et al. | 715/755 |
| 5,579,520 A | | 11/1996 | Bennett | |
| 5,708,827 A | * | 1/1998 | Kaneko | G06F 17/246 715/219 |
| 5,721,847 A | * | 2/1998 | Johnson | G06F 3/0481 715/209 |
| 5,883,623 A | * | 3/1999 | Cseri | 715/866 |
| 5,893,123 A | * | 4/1999 | Tuinenga | G06F 17/246 715/209 |
| 6,061,665 A | * | 5/2000 | Bahreman | 705/40 |
| 6,405,225 B1 | * | 6/2002 | Apfel | G06Q 10/107 709/206 |
| 6,542,880 B2 | | 4/2003 | Rosenfeld et al. | |
| 6,584,836 B1 | * | 7/2003 | Shteinhauz | G01M 17/02 73/146 |
| 6,634,019 B1 | * | 10/2003 | Rice et al. | 717/127 |
| 6,654,950 B1 | * | 11/2003 | Barnishan | 717/136 |
| 6,718,534 B1 | | 4/2004 | Carter et al. | |
| 6,779,151 B2 | | 8/2004 | Cahill et al. | |
| 7,093,240 B1 | | 8/2006 | Rodi et al. | |
| 7,353,502 B2 | | 4/2008 | Stewart et al. | |

(Continued)

FOREIGN PATENT DOCUMENTS

WO WO-00/04707 A1 1/2000

*Primary Examiner* — Chat Do
*Assistant Examiner* — Jae Jeon
(74) *Attorney, Agent, or Firm* — Cesari & McKenna, LLP; Omar M. Wadhwa

(57) ABSTRACT

A method and apparatus are provided for automatically integrating software components for use in a COM compliant application from functions developed outside of the COM compliant application environment. The method and apparatus provide a user interface and a build tool that allows the user to select desired functions and select desired locations in the COM compliant application and map those locations to inputs and outputs of the function and create the component automatically from the user's selections. The method and apparatus provide a graphical user interface for the user to direct a build tool to generate the desired component and integrate that component with the COM compliant application.

26 Claims, 11 Drawing Sheets

(56) References Cited

U.S. PATENT DOCUMENTS

| | | | |
|---|---|---|---|
| 7,624,372 B1* | 11/2009 | Stewart | G06F 17/246 717/106 |
| 8,225,300 B1 | 7/2012 | Webb et al. | |
| 8,321,847 B1* | 11/2012 | Garvin | G06F 8/31 717/108 |
| 8,806,428 B1 | 8/2014 | Webb et al. | |
| 2002/0035581 A1* | 3/2002 | Reynar et al. | 707/513 |
| 2002/0091871 A1* | 7/2002 | Cahill | G06F 17/246 719/315 |
| 2002/0129342 A1 | 9/2002 | Kil et al. | |
| 2003/0009536 A1 | 1/2003 | Henderson et al. | |
| 2003/0030664 A1* | 2/2003 | Parry | G06F 9/4411 715/744 |
| 2003/0056181 A1* | 3/2003 | Marathe | G06F 17/246 715/267 |
| 2003/0106040 A1 | 6/2003 | Rubin et al. | |
| 2003/0126058 A1* | 7/2003 | Hunter | 705/36 |
| 2003/0226105 A1 | 12/2003 | Waldau | |
| 2004/0006762 A1 | 1/2004 | Stewart et al. | |
| 2004/0015783 A1 | 1/2004 | Lennon et al. | |
| 2004/0025170 A1 | 2/2004 | Cao | |
| 2004/0039727 A1 | 2/2004 | Dessloch et al. | |
| 2004/0103366 A1* | 5/2004 | Peyton-Jones | G06F 17/246 715/213 |
| 2006/0053383 A1 | 3/2006 | Gauthier et al. | |
| 2008/0004737 A1* | 1/2008 | Bennardo | G06F 17/50 700/97 |
| 2008/0256508 A1* | 10/2008 | Jonsson | G06F 8/10 717/104 |

* cited by examiner

METHOD FOR INTEGRATING SOFTWARE COMPONENTS INTO A SPREADSHEET APPLICATION

RELATED APPLICATIONS

This application is a continuation of U.S. application Ser. No. 10/414,693, entitled "Method for Integrating Software Components into a Spreadsheet Application," filed Apr. 16, 2003, the contents of which are incorporated herein by reference.

TECHNICAL FIELD OF THE INVENTION

The present invention generally relates to data processing and, more particularly, to tools and methods for integrating software components into a selected program application.

BACKGROUND OF THE INVENTION

To achieve greater flexibility with software applications many software developers and architects have adopted the component based approach to software development. This approach allows for development of software components, which expose interfaces that allow applications and other components to access their features. Each component is a discrete component, each with a unique identity.

Although, software components are meant to achieve and provide great flexibility in integrating software components amongst different applications there remain some programming environments, such as block diagram programming environments or simulation programming environments where it is burdensome to integrate a component developed in these environments into software applications, for example Microsoft Excel®. Conventionally when a programmer wishes to integrate a component or even a portion of a component developed in a block diagram programming environment or a simulation programming environment into a software application environment, the programmer must author the source code to perform that integration, have that source code compiled, and then executed by an electronic device to achieve the integration. This process is burdensome for it requires a programmer to author specific source code each time one wishes to integrate a component from block diagram programming environment or a simulation programming environment into a software application environment. Moreover, because the conventional integration process requires one with programming skills, a mere user of the application program with no programming skills would be challenged to integrate the component from block diagram programming environment or a simulation programming environment into a software application environment.

SUMMARY OF THE INVENTION

The illustrative embodiment of the present invention addresses the above-described limitations of the conventional methods for integrating a component into an application. The illustrative embodiment provides an approach that allows a user to select a number of functions from a selected programming environment and automatically integrate those functions into software component for use by an application program. Moreover, the illustrative embodiment is able to generate executable code based on the user's selections to execute the selected functions. The executable code is accessible from the application software.

In one aspect of the present invention, a method is performed in a selected programming environment for automatically integrating a software component into a spreadsheet application environment. The method selects a first component from the selected programming environment, and, in turn, integrates the first component into the spreadsheet application environment in an automatic manner. The first component is integrated into the spreadsheet application environment by automatically creating a program code to perform the integration. Once the component is integrated into the spreadsheet application environment that environment is able to access one or more functions developed in the selected programming environment. In one aspect, information about the first component is processed to create the program code.

A portion of the information processing includes, mapping a first range of cells from the spreadsheet application environment to an input of the first component and mapping a second range of cells from the spreadsheet application environment to an output of the first component. The first range of cells having at least one cell and the second range of cells having at least one cell. Optionally, the method is capable of generating an executable program callable by the spreadsheet application environment. The executable program integrating the first component into the spreadsheet application environment and creating a callable set of instructions for executing a function of the selected component from the spreadsheet application environment.

The method is further capable of selecting a second component from the selected programming environment, ordering the first and second component in a desired order, the desired order defining an order of execution, and executing a function of the first and a function of second component in the desired order.

In another aspect of the present invention, an electronic device is provided. The electronic device includes a display device for viewing by a user, an input device for use by the user, and a build tool responsive to inputs from the user for selecting one or more components from a first application program developed in a first programming environment and integrating the component into a second application program developed in a second programming environment. The build tool automatically generates instructions to integrate the selected component into the second application program. The build tool is capable of rendering a user interface on the display device to allow the user to provide the build tool with the inputs using the input device.

The user interface allows a user of the electronic device to select one or more functions from the one or more selected components and sequence the selected functions in a desired order for execution by the electronic device from the second application program. Moreover, the user interface is capable of tracking the inputs of the user to determine a desired order of sequencing execution of one or more functions selected from the one or more components from the first application program and mapping one or more inputs and outputs of the selected functions to one or more locations in the second application. The one or more locations providing the functions with one or more input values and one or more destinations to place an output of the functions. Furthermore, the build tool formats input values mapped from the first application program to the functions from a format understood by the first application program to a format understood by the second application program and the build tool formats outputs of the functions from the format understood by the functions to the format understood by the first application program.

In a further aspect of the present invention, a method is performed in a computer system for integrating software components into a spreadsheet application. The method provides steps for browsing one or more software components in a selected application environment, selecting at least a desired one of the software components, and selecting one or more functions from the desired software component. The method further provides a step for integrating the selected functions into the spreadsheet application as a component. The computer system automatically integrating the selected functions into the spreadsheet application to avoid having a user of the computer system manually script instructions for integrating the selected software functions.

The method further provides steps for, selecting a first cell from the spreadsheet application to identify that cell as holding an input for at least one of the selected functions, and selecting a second cell from the spreadsheet application to identify that cell as a destination for an output of at least one of the selected functions. Furthermore, the method allows a user of the system to select a desired input of one of the selected functions, and associate the desired input with a selected cell of the spreadsheet application. The association allowing the selected function to the automatically re-execute if a value of the cell changes.

The system can automatically integrate the selected function into the spreadsheet application by reading information about the components from a file of the system, creating an object containing information on classes contained in the selected component, and constructing a call to one or more methods of the selected component using the information contained in the object.

In another aspect of the present invention, a device readable medium holding device executable instructions for performing a method is provided. The device readable medium includes instructions for rendering a user interface on a display device. The user interface allows a user to browse and select software components in a selected programming environment for integration into a spreadsheet application.

Further instructions allow the device to accept the user selections via the user interface, and integrate the selected software components into the spreadsheet application. The integration of the selected software components into the spreadsheet application occurring automatically as guided by the user selections accepted via the user interface. The user interface further allows the user to browse and select one or more functions of the selected software components.

The medium further includes instructions for processing information about the selected software components to construct calls to class methods of the software component, and generating an executable program in response to the accepted user selections. The executable program when executed reconstructs each method call in a user determined order.

BRIEF DESCRIPTION OF THE DRAWINGS

An illustrative embodiment of the present invention will be described below relative to the following drawings.

DETAILED DESCRIPTION

The illustrative embodiment of the present invention provides a method and apparatus for automatically integrating a software component from a first programming environment (e.g. MATLAB) into a second programming environment (e.g. Microsoft Excel). Through the use of a graphical user interface, the method and apparatus of the present invention allows a user to browse and select components from the first programming environment, and have portions of the selected components sequence automatically integrated into the second programming environment. The portions of the selected components automatically integrated into the second programming environment can be functions developed in the first programming environment. The method and apparatus of the present invention does not require the user to manually write or script code to perform the integration of the selected portions of the software component from the first programming environment to the second programming environment. The method and apparatus automatically or independently generates the necessary program code to perform the integration.

The method and apparatus of the present invention also allows the user to map via the graphical user interface inputs and outputs of selected portions of the selected components to locations in the second programming environment. In this manner, values from the second programming environment are selected and passed to the software component generated in the first programming environment, and, in turn, an output value from the selected software component is passed back to a selected location in the second programming environment. Moreover, the method and apparatus allow the user to define an execution sequence for the second programming environment to execute the selected portions of the components from the first programming environment. Consequently, a user without programming knowledge in the first programming environment is able to generate a program that is capable of making calls to the software components developed in the first programming environment and return a result in a format understandable by the second programming environment.

Figure 1:
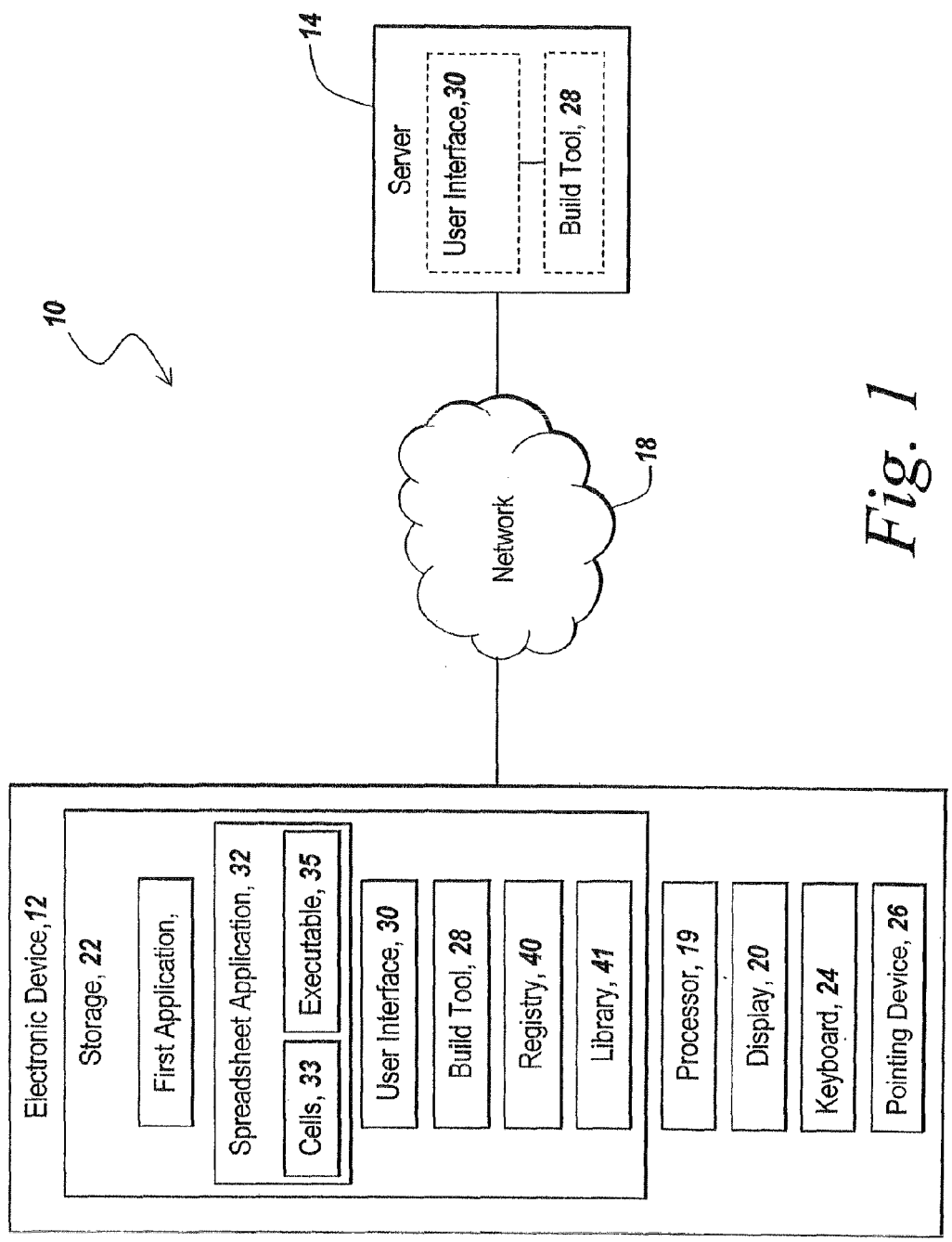
FIG. 1 is an exemplary block diagram illustrating an environment suitable for practicing the illustrative embodiment of the present invention.

FIG. 1 illustrates an environment suitable for practicing an illustrative embodiment of the present invention. A computer system 10 includes an electronic device 12, a network 18, such as the Internet, an intranet, or other suitable network either wired, wireless or a hybrid of wired and wireless, and, optionally, a server 14 or other electronic device. The electronic device 12 includes a microprocessor 19 for executing various instructions and programs, and controlling various hardware and software components, a display device 20 for use in rendering textural and graphical images, a storage device 22 for storing various items such as a registry file 40, a type library 41 and other data, information and programs. The electronic device 12 also includes a keyboard 24 and a pointing device 26, such as a mouse, track ball, or light pen. The storage device 20 includes a first application 34 for use in developing software components, a spreadsheet application 32 for use in reviewing outputs of the software components developed using the first application 34. The first application, will be described below for illustrative purposes, to be MATLAB from the Mathworks, Inc. of Natick, Mass. Nevertheless, those skilled in the art will appreciate that the first application 34 may be another application, such as, but not limited to a graphical programming environment or block diagram modeling tool. The spreadsheet application 32 may be for example, Microsoft Excel or Corel Quatro Pro. The spreadsheet application 32 provides spreadsheets with cells 33 and one or more executable programs 35 that provide the spreadsheet application 32 with additional functionality or extends the capability of the same. The storage device 20, and hence the electronic device 12 further includes a user interface 30 and a build tool 28.

The user interface 30 in conjunction with the build tool 28 provides a user of the system 10 with textual and graphical information that allow a user to browse and select software components developed with the first application 34 for integration into the spreadsheet applications 32. The user interface 30 and the build tool 28 are discussed below in more detail with reference to FIGS. 2-14.

The server 14 coupled to the network 18 is adaptable to include the user interface 30 and the build tool 28. In this manner, a number of users are able to access the user interface 30 and the build tool 28 via the network 18 without the need to have each user running a local copy of the user interface 30 and the build tool 28. Those skilled in the art will recognize that the electronic device 12 includes other software such as other user interfaces and other programs, such as one or more OS programs, compilers and various other program applications developed in a variety of programming environments for controlling system software and hardware components.

One well known framework for developing software components is the Component Object Model (COM). COM is an object based programming model developed by Microsoft® for use in building component based objects, programs and applications. Moreover, COM compliant objects, components, programs and applications offer interoperability due to their language-independence and have built-in interprocess communications capability.

The process of developing a COM object requires a developer to have a working knowledge of an underlying object based programming language that is utilized to develop the COM object. Such object based programs and applications provide the capability to define classes and to construct and utilize objects that are specific to that object system. Suitable object based programming languages include such well known programming languages as Java®, from Sun Microsystems, Inc. of Palo Alto, Calif., C++, Excel®, and Visual Basic® from Microsoft Corporation of Redmond, Wash., and MATLAB® from The Mathworks of Natick, Mass. An object is a software artifact that has attributes and behaviors. Behaviors are also referred to as functions. The functions of a particular object are utilized or called via the methods contained in a class definition for the object.

The build tool 28 enables a user of the system 10 to integrate selected components and functions from the first application 34 into the spreadsheet application 32. For illustrative purposes, the spreadsheet application 32 is a COM compliant application capable of using Visual Basic for Applications (VBA), although the spreadsheet application 32 could be another type of application software, such as presentation application software or other numerical processing application software developed under the framework of COM or other like standard. In the illustrative embodiment, the first application 34 is developed using the program language of MATLAB®, a software product available from the Mathworks, Inc. of Natick, Mass. The first application 34 includes various functions, such as mathematical functions and graphical functions coded in the MATLAB® programming environment. Those skilled in the art will recognize that functions developed in the MATLAB® programming environment are often referred to as "M-functions".

The build tool 28 generates a stand alone COM object for each selected function based on inputs from a user of the electronic device via the user interface 30. The build tool 28 is responsible for loading and unloading objects, converting data from the spreadsheet application 32 into an internal format, and calling selected methods on a given object of the first application 34. The build tool 28 is also capable of generating program code in a programming language such as Visual Basic from a current state of the spreadsheet application 32 and the build tool 28. As such, when the generated code is called by the spreadsheet application 32 the functions of the first application 34 are called exactly as the user of the user interface 30 has sequenced them. The build tool 28 interfaces with and is controlled by the user interface 30. The build tool 28 is capable of being embedded in the spreadsheet application 32 as a "plug-in" or "add on" to provide additional functionality or to the capability of the spreadsheet application 32.

Figure 2:
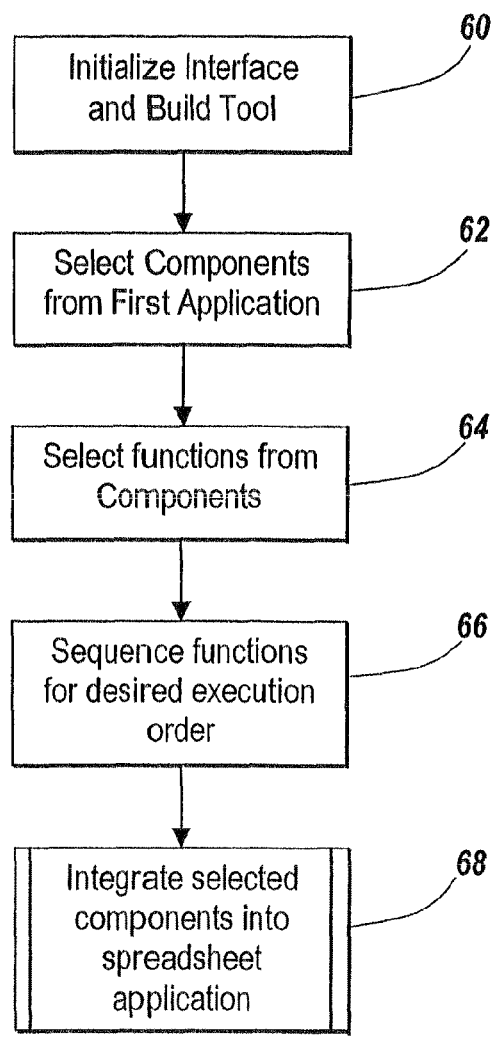
FIG. 2 is an exemplary flowchart that provides an overview of steps taken to practice the illustrative embodiment of the present invention.

FIG. 2 illustrates steps taken to practice an illustrative embodiment of the present invention. The user of the system 10 upon determination that it is desirable to pass data from the spreadsheet application 32 to a function of the first application 34 and have that function return an output to the spreadsheet application 32, the user initializes the user interface 30 and the build tool 28 by entering the appropriate command or request (Step 60). Once the user interface 30 and the build tool 28 are initialized, the user using the pointing device 26 or the keyboard 24 or a touch screen if the display device 20 is so equipped, begins selecting components from the first application 34 through the user interface 34 (Step 62). When the user selects a desired component from the first application 34, the user interface 30 can display via the display device 20 the functions of the selected component and therefrom the user, in turn, selects desired functions of the selected component (Step 64). If the user so desires, the user via the user interface 30, sequences the selected functions in a desired order which represents an ordering sequence for execution of the functions by the electronic device 12 (Step 66). When the selected functions are in the desired order of execution, the build tool 28 integrates the selected functions into the spreadsheet application 32 as a COM compliant component (Step 68). Consequently, the spreadsheet application 32 is able to access functionality designed using the first application 34, for example, a MATLAB® application, without the need for the user to manually script or generate code to create the new component.

Figure 3:
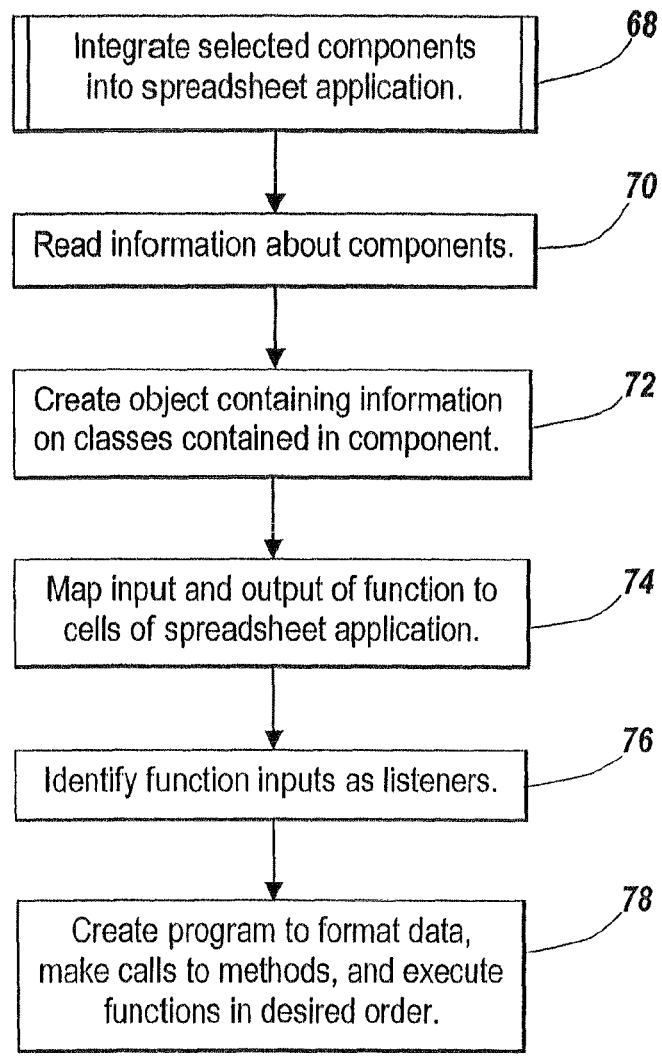
FIG. 3 is a more detailed flow diagram of the flow diagram illustrated in FIG. 2.
Figure 4:
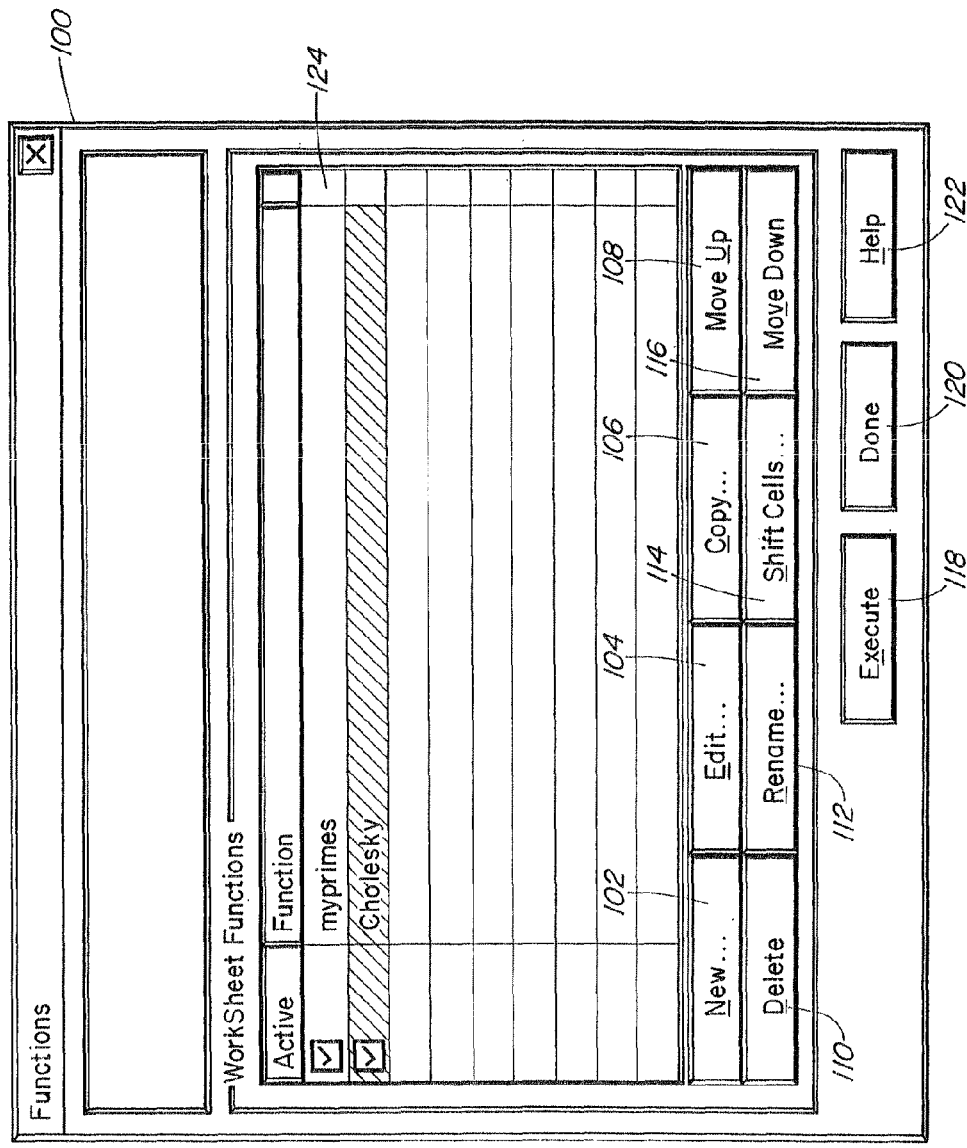
FIG. 4 depicts an exemplary window of the user interface provided by the illustrative embodiment of the present invention.

FIG. 3 illustrates the steps taken to integrate the selected portions of the components into the spreadsheet application 32 in more detail. The build tool 28 reads information about the components of the first application 34 that are installed on the storage device 22, for example, the system registry 40. Using this information, the build tool 28 locates a component type library 41 on the electronic device 12 and in turn loads the type library 41 (Step 70). From this type library 41, the build tool 28 creates a meta data object (Step 72). The meta data object for a selected component contains the type of information necessary to construct a call to any method of any of its classes at run time. For a given class, this information includes the name of all the class methods and information needed to construct a call to the method such as, number or inputs, number of outputs, names of arguments, and whether or not an input is able to handle variable arguments and whether an output is also able to handle variable arguments. The build tool 28 uses this information to construct calls to the class methods.

The build tool 28 based on input received from the user via the user interface 30 maps input and output arguments to selected ranges of cells 33 of the spreadsheet application 32 (Step 74). Optionally, once the meta data object is created and the user maps the input and output arguments of the selected functions to selected ranges of cells in the spreadsheet application 32, the user can request the build tool 28 to execute the currently selected functions. In this instance, the build tool 28 converts each input argument from a format understandable by the spreadsheet application 32 to a format suitable for calling the class method (i.e. a format understandable by the first application 34). After the selected function executes, the build tool 28 collects the output of the function, formats the output from the format understandable by the first application 34 into the format understandable by the spreadsheet application 32 and passes the output to the cells 33 of the spreadsheet application 32 that the user has selected for the results. At the user's option, the user can select a particular input variable of a function to react, watch or listen for change events that occur to that particular input. As such, when an input is mapped from a selected cell to the selected function in this manner, the method containing the variable is automatically re-executed each time the cell associated with that variable changes. It will be appreciated by those skilled in the art that the user is not limited to selecting a single cell for this feature and is able to define a range of cells so that if any cell in the range changes the method containing the variable automatically re-executes.

The build tool 28 is capable of generating an executable program code 38 at the request of the user (Step 78). The user is provided with a graphical object via the user interface 30 that allows the user to request the build tool 28 to generate a code module, such as a Visual Basic code module that reconstructs each method call as a visual basic subroutine. In this manner, the build tool 28 when instructed to generate the executable program code 38 collects the meta data objects for all components currently loaded on the electronic device 12 as well as the mappings of inputs and outputs of cells in active worksheets and generates the Visual Basic code module. The build tool 28 can further generate a single top level function that calls all the subroutines in the same order that they were sequenced by the user in Step 66 of FIG. 3. In this manner, once the Visual Basic code module is generated it can be placed into a selected VBA project of the spreadsheet application 32.

FIGS. 4-14 show various screen shots of the user interface 30 and will be used to illustrate an illustrative embodiment of the build tool 28 from a users perspective. Those skilled in the art will recognize that the user interface screen shots depicted in FIGS. 4-14 are merely illustrative and may be depicted in a number of suitable manners. Upon initialization of the user interface 30 and the build tool 28, or at any time thereafter, the main window 100 (FIG. 4) is rendered on the display device 20. The main window 100 controls the execution of functions from the first application 34 accessible by the spreadsheet application 32. The main window 100 also organizes the list of all currently loaded functions of the first application 34 accessible to the spreadsheet application 32. The main window 100 provides the user with a series of graphical user interface objects such as the following buttons: "New" 102, "Edit" 104, "Copy" 106, "Move Up" 108, "Delete" 110, "Rename" 112, "Shift Cells" 114, "Move Down" 116, "Execute" 118, "Done" 120, and "Help"122. The main window 100 also provides a textual display 124 which lists the names of all loaded functions and also provides a check box in the vicinity of each function name to allow the user to enable or disable each displayed function. Deactivated functions are not executed when the "Execute" button 118 is selected.

Figure 5:
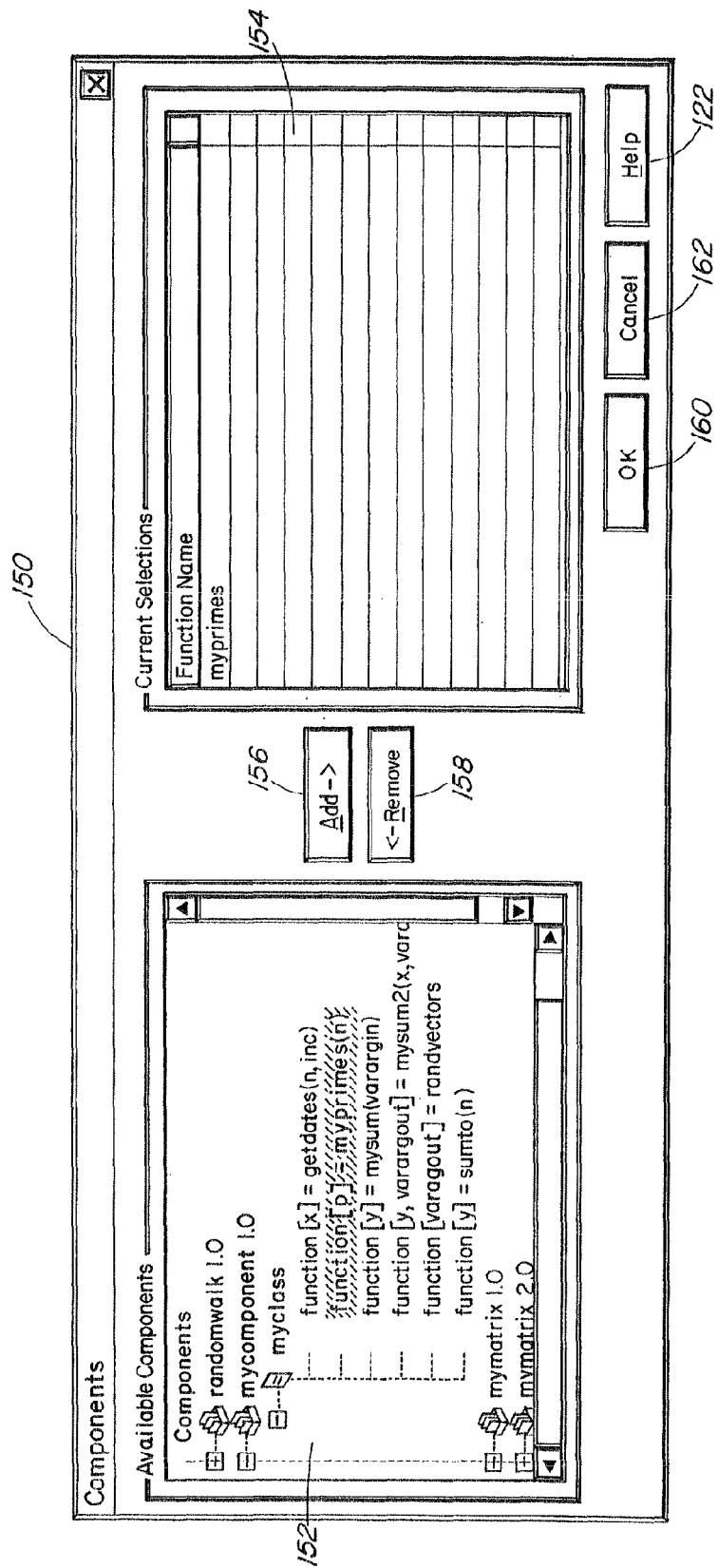
FIG. 5 depicts an exemplary window of the user interface for browsing and selecting components and component functions in the illustrative embodiment of the present invention.

The "New" button 102 displays a component browser window 150 illustrated in FIG. 5 when selected. The component browser window 150 is discussed in more detail with reference to FIG. 5. The "Edit" button 104, when selected, causes the user interface 30 to render on the display device 20 the function properties window 170 which will be discussed in more detail with reference to FIG. 6. The "Copy" button 106 allows the user to make copies of a selected function and causes the user interface 30 to render on the display device 20 a copy function window 280 discussed in more detail with reference to FIGS. 12 and 13.

The "Move Up" button 108 moves a selected function ahead in execution order when selected. The "Delete" button 110 deletes the selected function when selected. For example, in the main window 100 the function named "CHOLESKY" is the selected function and if the user selects the "Delete" button 110 the build tool 28 would delete the selected function from the list of currently loaded functions from the first application 34 accessible to the spreadsheet application 32. The "Rename" button 112 allows the user to rename a selected function when selected. The "Shift Cells" button 114 moves cells associated with the inputs and outputs of the selected function from a first location to a second location in a worksheet or in another worksheet of the spreadsheet application 32. The "Move Down" button 116 moves a selected function back in execution order when selected.

The "Execute" button 118 executes all active functions when selected. The functions are executed in the order they appear in the list of the display window 124 that is, from top to bottom although one skilled in the art will recognize that the build tool 28 can be programmed to execute all active functions in an order from bottom to top or in any other user defined order. The "Done" button 120 exits the user interface 30 and the "Help" button 122 invokes the help features of the build tool 28.

Figure 6:
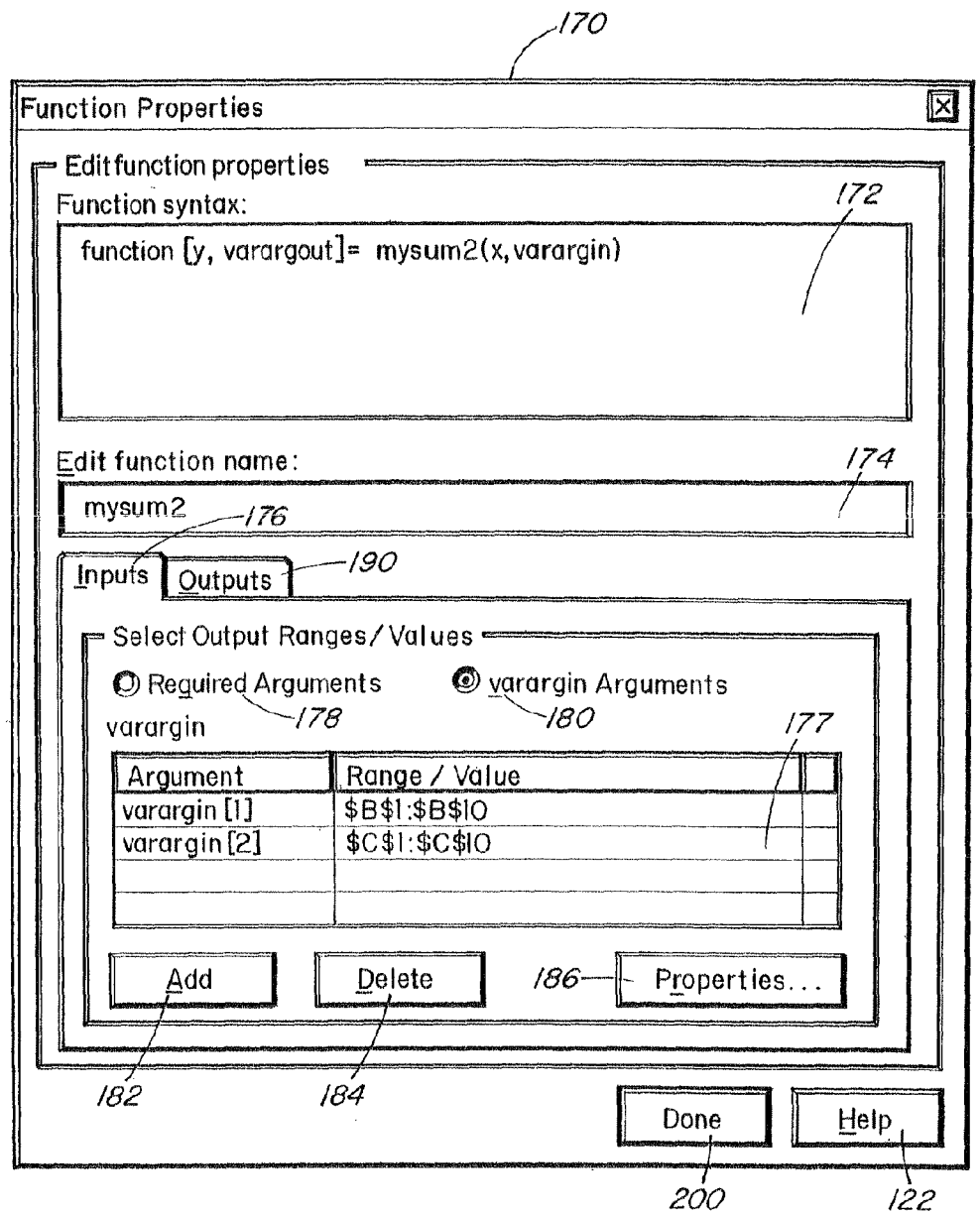
FIG. 6 depicts an exemplary window of the user interface for associating function inputs to a COM compliant application.

To integrate a portion of a component from the first application 34 into the spreadsheet application 32 the user selects the "New" button 102 from the main window 100. The selection of the "New" button 102 causes the user interface 30 to display the component browser window 150 (FIG. 5) on the display device 20. The component browser window 150 is partitioned into a first area 152 having a windows-like tree structure that displays the available components from the first application 34. The second area 154 indicates the current function selected by function name. Once the user selects a component from the first area 152, for example, "my component 1.0" the user is then able to view the functions of the selected component. If the user wishes to add a function from the selected component to a component they are integrating into the spreadsheet application 32 the user selects the desired function, for example, by highlighting the function and clicking an "Add" button 156. The user continues in this manner browsing components from the first application 34 for desired functions. Should the user wish to remove a selected function, the user in similar fashion to adding a function, selects the function they wish to remove from the second area 154 and in turn selects a "Remove" button 158 which updates the area 154 to reflect the users change. When the user has selected all the functions that they desire to integrate into the spreadsheet application 34 they select an "OK" button 160. Selection of the "OK" button 160 causes the user interface 30 to render a function properties window 170 on the display device 20, which is depicted in FIG. 6. Selection of a "Cancel" button 162 returns the user to the main window 100 without loading the selected functions. To invoke the "Help" features of the build tool 28 the user can select the "Help" button 122.

FIG. 6 depicts the function properties window 170, which provides the user with a variety of dialogue boxes and other graphical user interface elements to set properties and values for the inputs and outputs of the selected functions. The function properties window 170 allows the user to map inputs and outputs to cells or cell ranges in the spreadsheet application 32 and also allows the user to rename a function. The function properties window 170 includes a dialogue box 172 that provides the user with a function syntax of a selected function. In this illustrative embodiment the illustrated function syntax reflects a MATLAB® calling convention. A second dialogue box 174 provides a location for a user to enter a new function name to rename the selected function.

The properties function window 170 includes a first tab control element 176 labeled "Inputs" and a second tab control element 190 labeled "Outputs". The first tab control element 176 includes a dialogue box 177 that displays selected function arguments for editing. The first tab control element 176 also includes a first push button element 178 for selecting required arguments and a second push button element 180 for selecting variable arguments of the function being edited, that is the selected function from the dialogue box 177. The first tab control element 176 includes an "Add" button 182 and a "Delete" button 184, which in the illustrative embodiment of the present invention, become active when the second push button element 180 becomes active. The first tab control element 176 in the illustrative embodiment is depicted to enable editing of input arguments for the selected function while the second tab control element 190 provides the user with editing capabilities for output arguments of the selected function. The first tab control element 176 also includes a "Properties" button 186, which when selected allows the user to set properties of a selected argument. The function properties window 170 includes a "Done" button 200 that the user selects when editing of the function properties is complete and further includes the Help button 122 for invoking the Help features of build tool 128.

Figure 7:
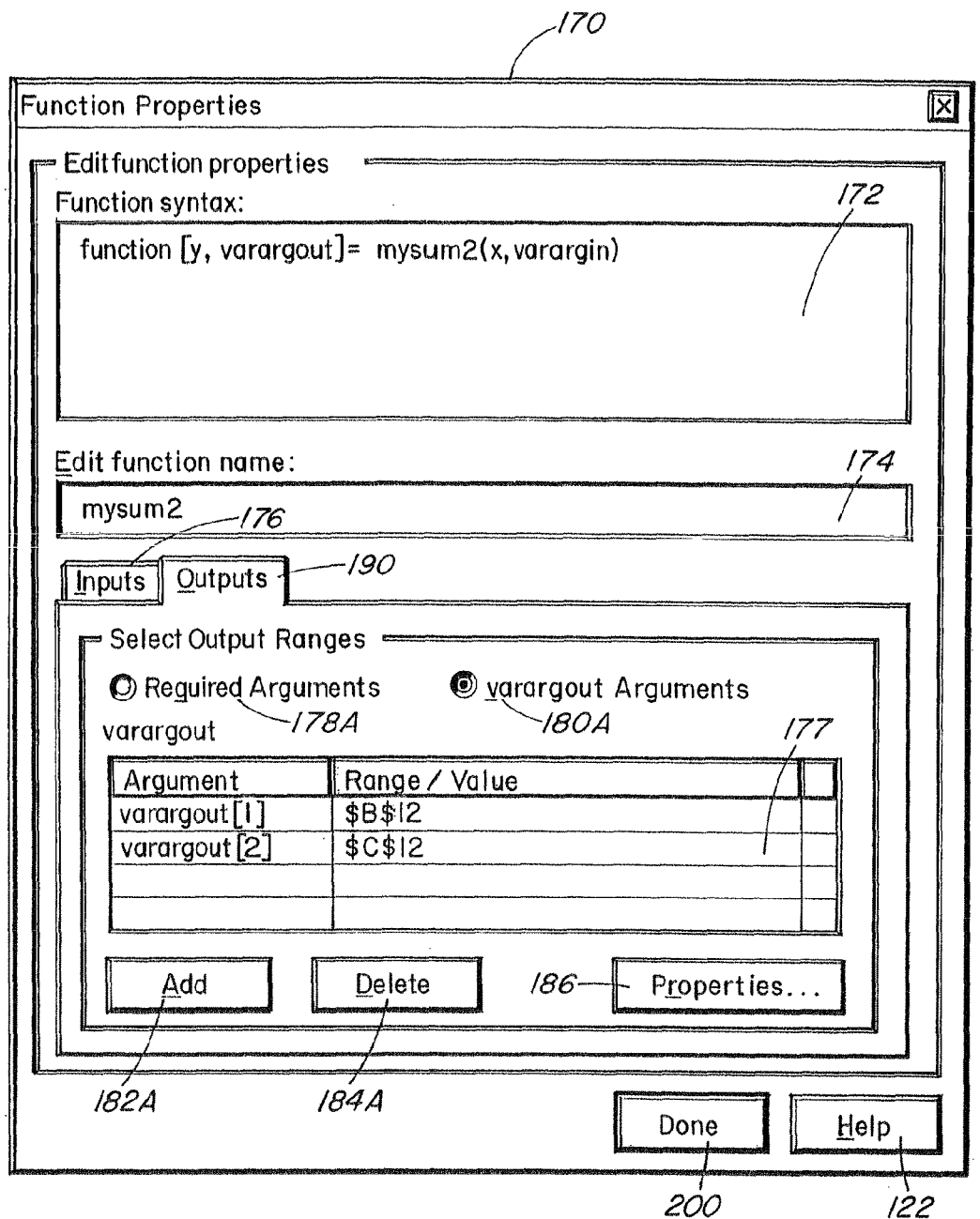
FIG. 7 depicts an exemplary window of the user interface for associating outputs of a selected function with locations of a COM compliant application in the illustrative embodiment of the present invention.
Figure 8:
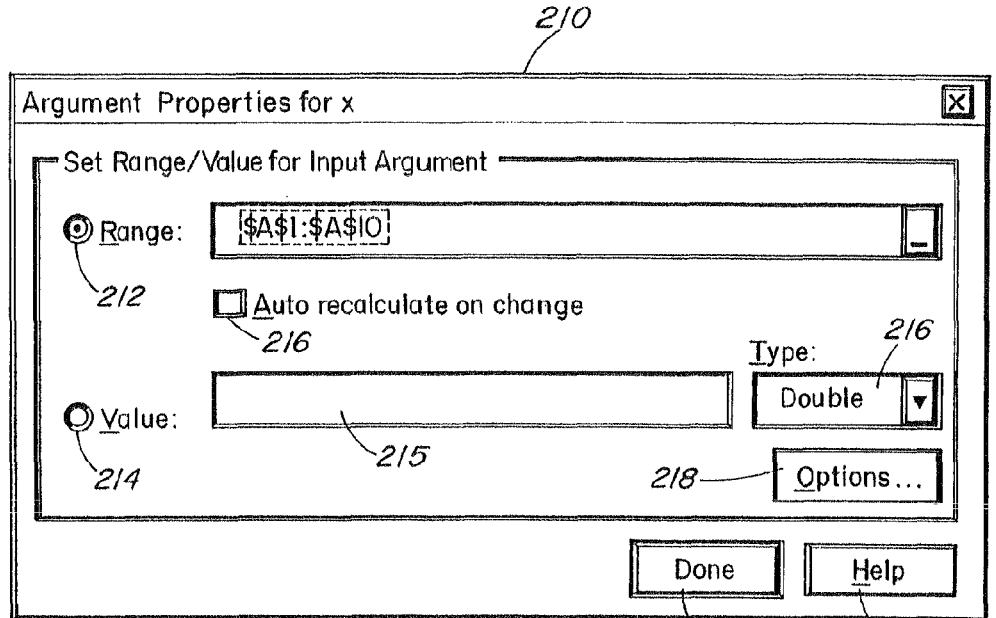
FIG. 8 depicts an exemplary window of the user interface for defining an input range for a selected function in accordance with the illustrative embodiment of the present invention.

FIG. 7 illustrates the function properties window 170 with the second tab control element 190 selected. With the second tab control element 190 selected the user is able to edit the required arguments and the variable arguments of the outputs of the selected function. Like in the first tab control element 176, the "Add" button 182A and the "Delete" button 184A do not become active until the user selects the push button 180A for editing the variable output arguments. The selection of the properties button 186 from either the first tab control element 176 or the second tab control element 190 from the function properties window 170 causes the user interface 30 to display an argument properties window on the display device 20. The argument properties window displayed depends on which tab control element is active. For example, if the "Inputs" or first tab control element is active when the "Properties" button is selected an argument properties window 210 is displayed as depicted in FIG. 8. If the "Outputs" or second tab control element is active when the "Properties" button is selected an argument properties window 250 is displayed as depicted in FIG. 10.

Figure 9:
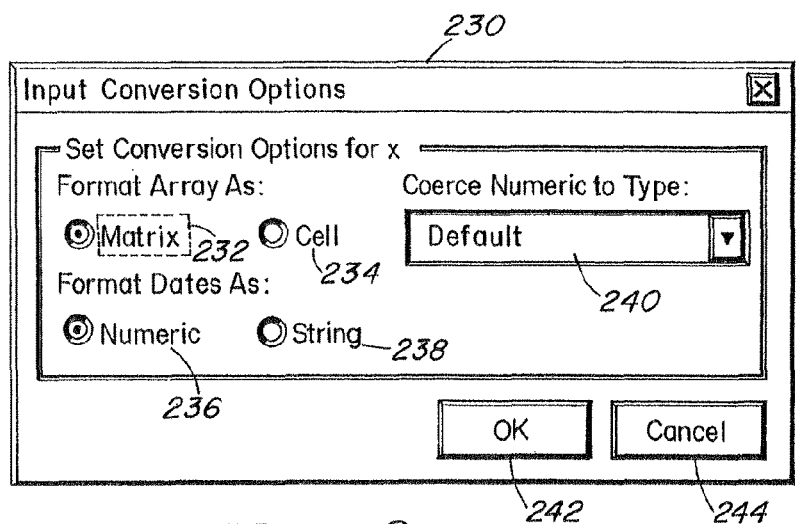
FIG. 9 depicts an exemplary window of the user interface for further defining inputs for a selected function in accordance with the illustrative embodiment of the present invention.

The argument properties window 210 (FIG. 8) allows the user to select a cell or range of cells for an input argument of the selected function. The argument properties window 210 includes a first push button 212 that allows the user to set a range of cells for an input of the current argument when selected. If the user so desires, the user can activate a check box 216 to have the current selected function perform a recalculation when any cell in the current argument changes value. A second push button 214 is provided in the arguments property window 210 to allow the user to set a value for input argument of the selected function. When the push button 214 is selected a dialogue box 215 and a group box 216 become active allowing the user to enter a value into the dialogue box 215 and then set a value type for the value from the group box 216. Value types available from the group box 216 include, but are not limited to, double, single, integer, long, Boolean, bite, string, and date. Selection of an "Options" button 218 causes the user interface 30 to display on the display device 20 an input conversion Options window 230, which is depicted in FIG. 9. The argument properties window 210 also includes a "Done" button 220 which saves the users input and returns the user to the main window 100. The argument properties window 210 also includes the "Help" button 122.

The input conversion options window 230 (FIG. 9) includes a first push button 232 labeled "Matrix" and a second push button 234 labeled "Cell" for use in formatting an array. The input conversion options window 230 also includes a third push button 236 labeled "Numeric" and a forth push button 238 labeled "String" for use in formatting a date type value. The input conversion options window 230 further includes a group box 240 that allows the user to coerce a numeric value to a particular type, for example, a default type, a double type, a single type, an int 32 type, an uint 32 type, an int 16, an uint 16, an int 8 and so on. When the user from the argument properties window 210 selects the second push button 214 labeled "Value" to identify the input argument as a value, the user using the input conversion options window 230 is able to format an array as a matrix by selecting the first push button 232 from the input conversion options window 230 or by formatting the array as a cell by selecting the second push button 234 from the input conversion options window 230. Should the user define the input argument as a value of type date from the argument properties window 210, the user using the input conversion options window 230 is able to format the date as numeric by selecting the third push button 236 or formatting the date as a string by selecting the forth push button 238. The selection of an "OK" button 242 by the user from the input conversion options window 230 saves the users selection and returns the user to the argument properties window 210. Selection of a "Cancel" button 244 from the input conversion options window 230 cancels any of the users selections in that window and returns the user to the argument properties window 210.

Figure 10:
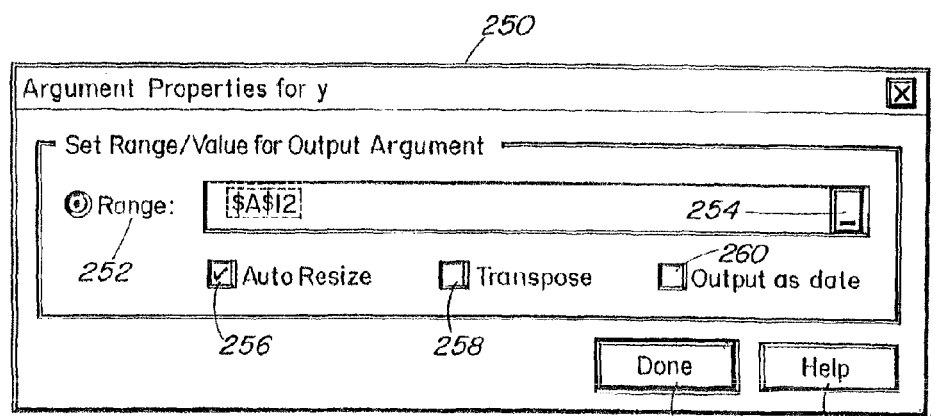
FIG. 10 depicts an exemplary window of the user interface for associating outputs of a selected function to location of a COM compliant application in accordance with the illustrative embodiment of the present invention.

FIG. 10 depicts the arguments properties window 250 for setting properties of an output argument for the selected function. The arguments properties window 250 includes a push button 252 labeled "Range" and a dialogue box 254. The arguments properties window 250 also includes a first check box 256 labeled "Auto Resize", a second check box 258 labeled "Transpose" and a third check box 260 labeled "Output As Date". The argument properties window 250 allows the user to select a range of cells in the spreadsheet application 32 for an output of the function. To specify or select a range of cells, the user selects the push button 252 and defines the cells or cell range in the dialogue box 254. If the user wishes the spreadsheet application 32 to automatically resize the output range to fit the data, the user can select the first check box 256. If the user wishes the spreadsheet application 32 to transpose an output array from the selected function, the user can select the second check box 258. In like manner, if the user wishes the spreadsheet application 32 to coerce output values from the selected function to dates, the user can select the third check box 260. When the user completes the selection of argument properties for the output of the selected function a "Done" button 262 can be selected to save the users selection and return the user to the function properties window 170. If the user desires help at any point in using the argument properties window 250 selection of the "Help" button 122 invokes the "Help" features of the build tool 28.

Figure 11:
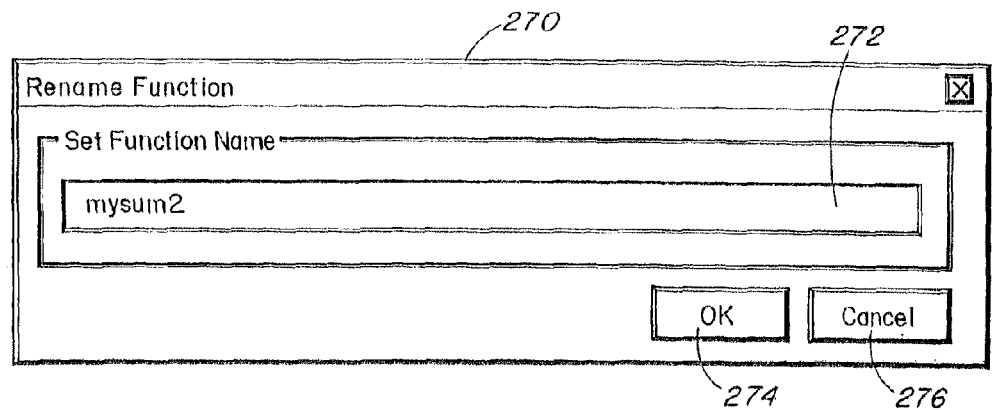
FIG. 11 depicts an exemplary window of the user interface for renaming a selected function in accordance with the illustrative embodiment of the present invention.

FIG. 11 depicts a rename function window 270 that allows the user to rename a selected function. The user interface 30 causes the rename function window 270 to be displayed on the display 20 when the user selects the "Rename" button 112 from the main window 100. The rename function window 270 provides the user with a textbox 272 to enter a new name for the selected function. To save the function under the new name, the user selects an "OK" button 274 to save the change and return the user to the main window 100. If the user does not wish to change the name of the function selection of a "Cancel" button 276 returns the user to the main window 100 without changing the name of the selected function.

Figure 12:
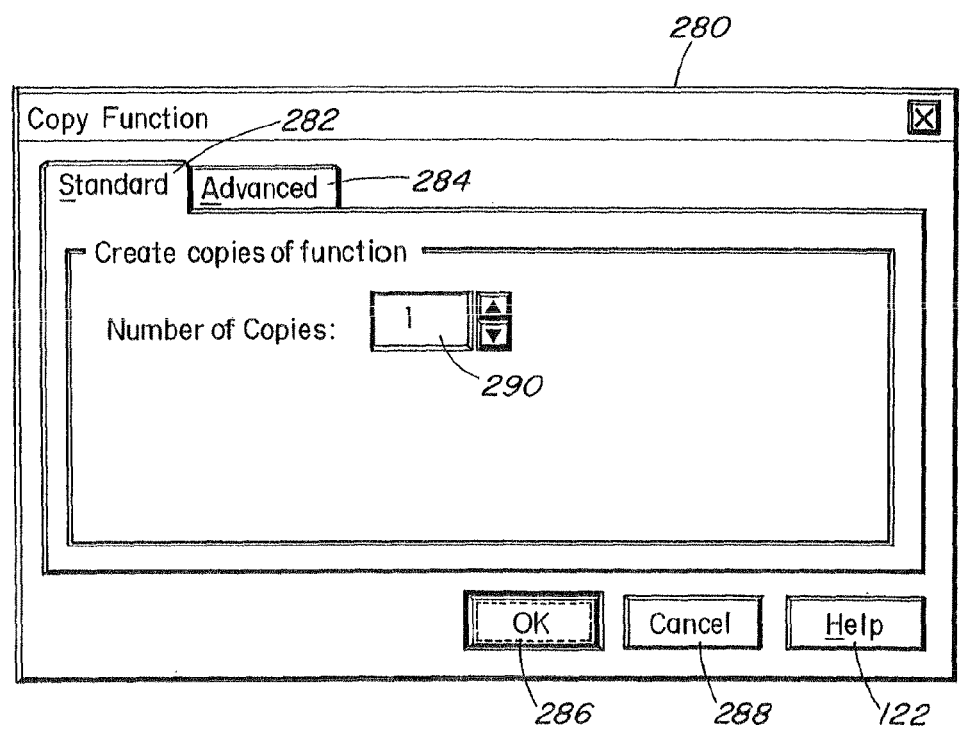
FIG. 12 depicts an exemplary window of the user interface for copying a selected function in accordance with the illustrative embodiment of a present invention.

FIG. 12 depicts a copy function window 280 that is displayed by the user interface 30 on the display device 20 when the "Copy" button 106 is selected from the main window 100. The copy function window 280 includes a first tab control element 282 labeled "Standard", a second tab control element 284 labeled "Advanced", an "OK" button 286, a "Cancel" button 288 and the "Help" button 122. The first tab control element 282 includes a scrollable textbox 290 that allows the user to set the number of copies they wish to make of the selected function.

Figure 13:
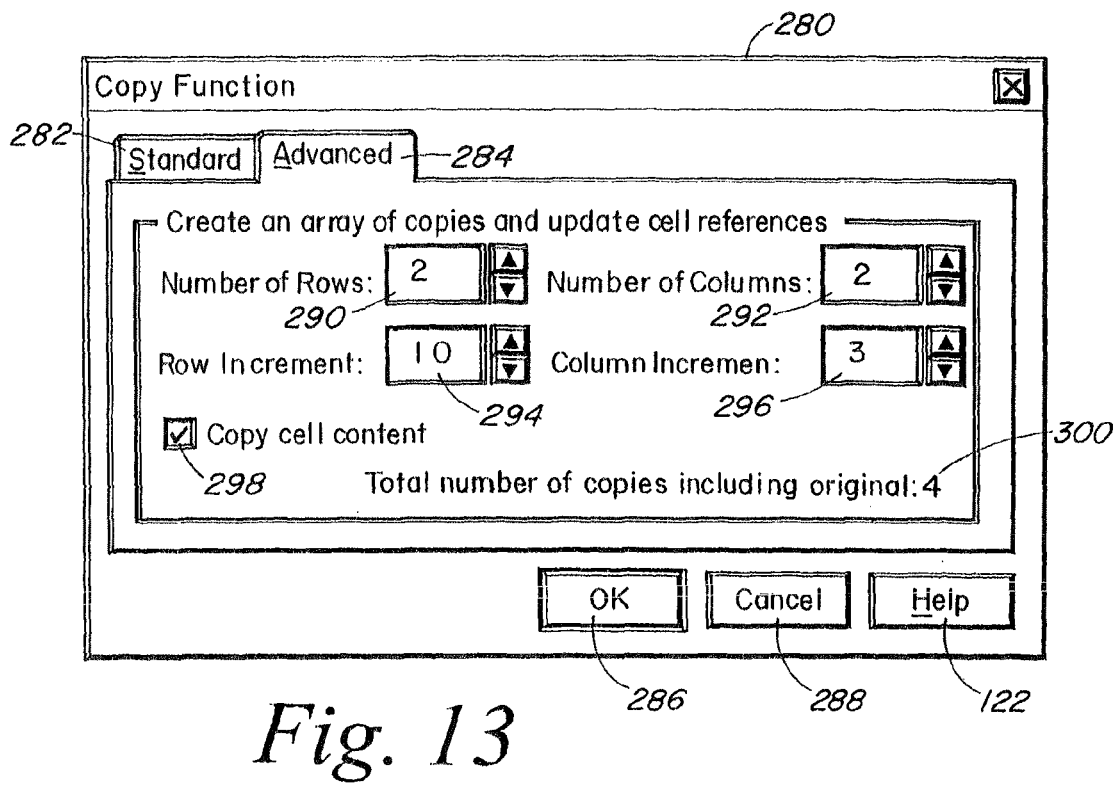
FIG. 13 depicts the exemplary window of FIG. 12 in more detail.

FIG. 13 depicts the copy function window 280 with the second tab element 284 selected. The second tab control element 284 includes the first scrollable text box 290 labeled "Number of Rows", a second scrollable text box 292 labeled "Number of Columns", a third scrollable text box 294 labeled "Row Increment", and a fourth scrollable text box 296 labeled "Column Increment". The second tab control element 284 also includes a checkbox 298 that allows the user, when activated, to copy all cell contents. The second tab control element 284 further includes a textual display element 300 that provides an indication to the user the total number of copies including the original. The first, second, third and fourth scrollable text boxes allow the user to create an array of copies and update cell references. For example, the first scrollable text box 290, "Number of Rows" allows the user to select a number of rows of cells from the spreadsheet application 32 for copying. In similar fashion, the second scrollable textbox 292, "Number of Columns" allows the user to select the number of columns of cells from the spreadsheet application 32 to be copied. The third scrollable textbox 294 "Row Increment" and the fourth scrollable textbox 296 "Column Increment" allow the user to move, or increment rows and columns of cells up, down, left, and right in one or more worksheets of the spreadsheet application 32. A positive values in the scrollable textboxes equates to positive increments and moves rows in a downward direction and columns to the right with reference to the display device 20 as the user is viewing the device. In contrast, negative values in the scrollable textboxes equates to negative increments and moves selected rows of cells in an upward direction in the spreadsheet application 32 and columns to the left with reference to the display device 20 as the user is facing the device.

An "OK" button 286 makes the copies in accordance with the information provided by the user and returns the user to the main window 100 when selected. Selection of a "Cancel" button 288 returns the user to the main window 100 without making the copies. Should the user wish to invoke the help features of the user interface 30 selection of the "Help" button 122 invokes such features.

Figure 14:
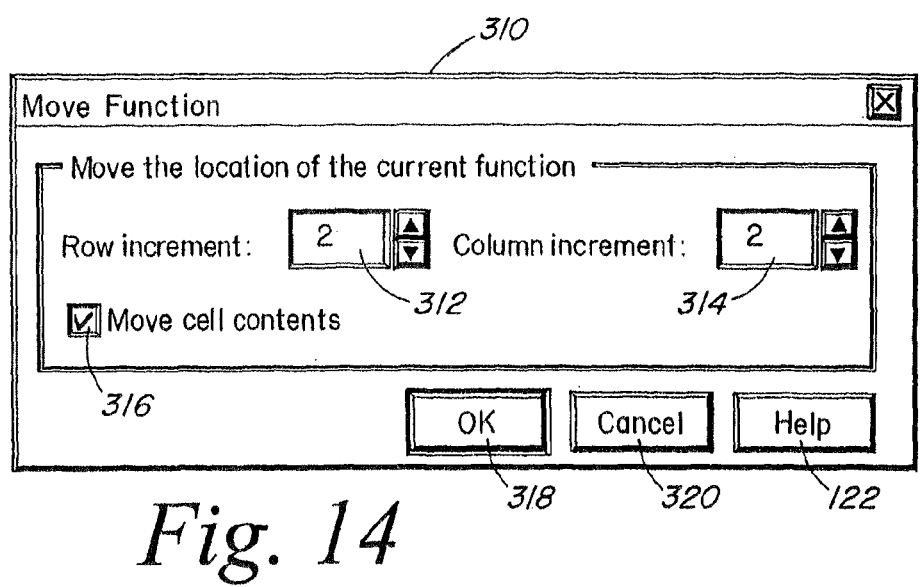
FIG. 14 depicts an exemplary window of the user interface for moving a selected function in accordance with the illustrative embodiment of the present invention.

FIG. 14 depicts an illustrative move function window 310 displayed on the display device 20 by the user interface 30 when the user selects the "shift cells" button 114 from the main window 100. The move function window 310 includes a first scrollable textbox 312 labeled "Row Increment" and a second scrollable textbox 314 labeled "Column Increment". The move function window 310 includes a checkbox element 316 labeled "Move Cell Contents", an "OK" button 318, a "Cancel" button 320 and the "Help" button 122. The move function window 310 allows the user to move contents of all worksheet cells of the spreadsheet application 32 as referenced by any argument of the current selected function. The user using the first scrollable textbox 312 and the second scrollable textbox 314 sets the row and column increments, respectively, that they desire the cell contents to move by.

The move function window 310 is capable of automatically updating cell references by the values entered into the first scrollable textbox 312 and the second scrollable textbox 314. Optionally, the user can activate the checkbox 316 to move the cell contents of any ranges referenced by the function. Positive increments in the first scrollable textbox 312 and the second scrollable textbox 314 move rows of cells in a downward direction and columns of cells to the right, as the user is facing the display device 20. Negative increments move rows of cells upwards and columns of cells to the left, as the viewer is facing the display device 20. Selection of the "OK" button 318 carries out the move operation and returns the user to the main window 100. Selection of the "Cancel" button 320 returns the user the main window 100 without carrying out the move.

Those skilled in the art will recognize that the various graphical user interface elements discussed above in FIGS. 4 through 14 are merely illustrative and are not meant to limit the present invention to the use of those graphical user interface elements. For example, push buttons or radio buttons can be used in place of check boxes or dialogue boxes without a scrollable feature can include a scroll box or elevator.

While the present invention has been described with reference to an illustrative embodiment thereof, one skilled in the art will appreciate that there are changes in form and detail that may be made without departing from the intended scope of the present invention as defined in the pending claims. For example, the graphical user interface and the build tool are adaptable and configurable to work with a large number of COM compliant applications to integrate a portion of a component written and developed in an environment that differs from the environment in which a COM compliant application was developed without the need for the user to write program code each time they sought to integrate the selected portions of selected components into the COM compliant application environment. Moreover, those skilled in the art will appreciate that all of the user interface windows depicted in FIGS. 4-14 are built using standard Microsoft graphical program components, such as those found in Visual Basic.

What is claimed:

1. An electronic device readable non-transitory storage medium storing electronic device readable instructions that, when executed, cause one or more processors to:
   receive, at a graphical user interface, user input selecting a component defined within a dynamically typed programming environment, the component including functions executable by the dynamically typed programming environment, the functions including input arguments and output arguments, wherein a build tool in conjunction with the graphical user interface allows for the selection of the component defined within the dynamically typed programming environment for integration into a spreadsheet application environment;
   receive a selection of two or more of the functions included in the component defined within the dynamically typed programming environment;
   arrange the two or more functions into a user defined execution sequence;
   receive a mapping of
      first cells of the spreadsheet application environment to the input arguments of the two or more functions, and
      second cells of the spreadsheet application environment to the output arguments of the two or more functions, the spreadsheet application environment being external to the dynamically typed programming environment;
   automatically generate, by the one or more processors, executable program code for calling the two or more functions from the dynamically typed programming environment;
   automatically integrate, by the one or more processors, the executable program code into the spreadsheet application environment;
   execute, by the one or more processors, the executable program code, the executing calling the two or more functions in the dynamically typed programming environment in the user defined execution sequence,
   providing data from the first cells of the spreadsheet application environment as the input arguments of the two or more functions, wherein the build tool converts the data from a format compatible with the spreadsheet application environment into an internal format that is compatible with the dynamically typed programming environment, and producing values for the output arguments of the two or more functions; and
   return the values for the output arguments, from the dynamically typed programming environment, to the spreadsheet application environment, the returned values written to the second cells of the spreadsheet application environment.

2. The storage medium of claim 1, wherein the automatically generated executable program code is a COM object.

3. The storage medium of claim 1, wherein the functions include a numeric function.

4. The storage medium of claim 1, wherein the functions include a graphical function.

5. The storage medium of claim 1, further storing instructions that when executed cause the one or more processors to:
   receive a selection identifying the second cells, the selection specifying a size or shape of the values for the output arguments.

6. The storage medium of claim 1, wherein one or more of the values for the output arguments is a matrix.

7. The storage medium of claim 1, wherein the values for the output arguments are a plurality of matrices.

8. The storage medium of claim 1, wherein the spreadsheet application environment is provided on a first electronic device, and the build tool is provided on a second electronic device remote from the first electronic device and connected to the first electronic device through a network.

9. The storage medium of claim 1, wherein the build tool is embedded in the spreadsheet application environment as a plug-in.

10. The storage medium of claim 1, wherein the two or more functions are executed on an electronic device remote from a user.

11. An electronic device readable non-transitory storage medium storing instructions that, when executed, cause one or more processors to:
   receive, at a graphical user interface, a selection of a plurality of functions provided by and defined within a dynamically typed programming environment, wherein a build tool in conjunction with the graphical user interface allows for the selection of the plurality of functions defined within the dynamically typed programming environment for integration into a spreadsheet application environment;
   arrange the plurality of functions into a user defined execution sequence;
   receive an input for a first function of the plurality of functions, where:
      the input is received from the spreadsheet application environment, and
      the spreadsheet application environment is external to the dynamically typed programming environment;
   generate executable program code for calling, from the spreadsheet application environment, the plurality of functions from the dynamically typed programming environment to execute in the user defined execution sequence;

execute the plurality of functions in the user defined execution sequence in the dynamically typed programming environment, the executing being called from the spreadsheet application environment and operating on the input to generate an output of a first type, where the output of the first type is:
  compatible with the dynamically typed programming environment, and
  incompatible with the spreadsheet application environment;

reformat the output into a second type, where the output of the second type is:
  compatible with the spreadsheet application environment;

identify, in response to user input, a plurality of cells in the spreadsheet application environment;

programmatically map, in the dynamically typed programming environment, the output of the second type to the plurality of cells in the spreadsheet application environment identified in response to user input; and return the output to the identified plurality of cells.

12. The storage medium of claim 11, wherein the output is an array.

13. The storage medium of claim 11, further storing instructions for providing the graphical user interface for allowing a user to specify a type for the input.

14. The storage medium of claim 13, further storing instructions for coercing the input to the specified type.

15. An electronic device readable non-transitory storage medium storing electronic device readable instructions that, when executed, cause one or more processors to:
  receive, at a graphical user interface, user input selecting a component developed and defined within a dynamically typed programming environment, wherein a build tool in conjunction with the graphical user interface allows for the selection of the component defined within the dynamically typed programming environment for integration into a spreadsheet application environment, where:
    the spreadsheet application environment is external to the dynamically typed programming environment, and
    the component provides a plurality of functions;
  receive, at the dynamically typed programming environment, an input for a first function of the plurality of functions from the spreadsheet application environment;
  generate executable program code for calling, from the spreadsheet application environment, the plurality of functions from the dynamically typed programming environment to execute in the user defined execution sequence;
  execute the plurality of functions at the dynamically typed programming environment in a user defined execution sequence, the executing operating on the input to generate an output of the first function, the output comprising of one or more values;
  identify a plurality of cells in the spreadsheet application environment, the plurality of cells identified in response to user input;
  programmatically map, at the dynamically typed programming environment, the one or more values of the output generated during execution of the plurality of functions at the dynamically typed programming environment to the plurality of cells in the external spreadsheet application environment identified in response to user input; and
  return the output to the spreadsheet application environment, the returned output to be written to the identified plurality of cells, wherein the output is converted, by the build tool, from a format compatible with the dynamically typed programming environment to a spreadsheet application format compatible with the spreadsheet application environment.

16. A method comprising:
  receiving, at a graphical user interface, user input selecting a plurality of functions provided at and defined within a dynamically typed programming environment, wherein a build tool in conjunction with the graphical user interface allows for the selection of the component defined within the dynamically typed programming environment for integration into a spreadsheet application environment;
  arranging the plurality of functions into a user defined execution sequence;
  receiving an input for a first function of the plurality of functions, where:
    the input is received from the spreadsheet application environment, and
    the spreadsheet application environment is external to the dynamically typed programming environment;
  generating executable program code for calling, from the spreadsheet application environment, the plurality of functions from the dynamically typed programming environment to execute in the user defined execution sequence;
  executing the plurality of functions in the user defined execution sequence in the dynamically typed programming environment, the executing operating on the input to generate an output of the first function, the output comprising values;
  identifying a plurality of cells in the spreadsheet application environment, the plurality of cells identified in response to user input;
  programmatically mapping, at the dynamically typed programming environment, the values of the output generated during execution of the first function to the plurality of cells identified in response to user input; and
  returning the output to the spreadsheet application environment, the returned output to be written to the identified plurality of cells, wherein the output is converted, by the build tool, from a format compatible with the dynamically typed programming environment to a spreadsheet application format compatible with the spreadsheet application environment.

17. The method of claim 16, wherein the plurality of functions are provided in a component in the dynamically typed programming environment.

18. The method of claim 16, wherein the component is a COM object.

19. The method of claim 16, wherein the first function is a numeric function.

20. The method of claim 16, wherein the first function is a graphical function.

21. The method of claim 16, wherein the output is a matrix.

22. The method of claim 16, wherein the output is a plurality of matrices.

23. A method comprising:

receiving, at a graphical user interface, user input selecting a plurality of functions defined within a dynamically typed programming application, the plurality of functions including one or more input arguments and one or more output arguments, wherein a build tool in conjunction with the graphical user interface allows for the selection of the plurality of functions defined within the dynamically typed programming environment for integration into a spreadsheet application;

arranging the plurality of functions into a user defined order of execution;

mapping first cells of the spreadsheet application to the one or more input arguments of the plurality of functions;

mapping second cells of the spreadsheet application to the one or more output arguments of the plurality of functions;

programmatically generating, by a processor, an executable program configured to execute the plurality of functions by the dynamically typed programming application in the user defined order of execution based on one or more calls in the spreadsheet application, utilize values from the first cells of the spreadsheet application as the one or more input arguments of the plurality of functions, and load computed values for the one or more output arguments of the plurality of functions into the second cells of the spreadsheet application, wherein the computed values are converted, by the build tool, from a format compatible with the dynamically typed programming environment to a spreadsheet application format compatible with the spreadsheet application; and placing the executable program in the spreadsheet application.

24. The method of claim 23 further comprising:
presenting the graphical user interface, where the mapping first cells and the mapping second cells is in response to user input at the graphical user interface.

25. The method of claim 23 further comprising:
generating a top level function that calls the plurality of functions in the user defined order of execution.

26. The method of claim 23 wherein a first function of the plurality of functions includes a first input argument, the method further comprising:

mapping a value to the first input argument of the first function.

* * * * *

UNITED STATES PATENT AND TRADEMARK OFFICE
CERTIFICATE OF CORRECTION

PATENT NO. : 9,582,288 B1  
APPLICATION NO. : 12/578101  
DATED : February 28, 2017  
INVENTOR(S) : James Stewart Page 1 of 1

It is certified that error appears in the above-identified patent and that said Letters Patent is hereby corrected as shown below:

In the Claims  
Claim 23, Column 17, Line 7 reads:  
coniunction with the graphical user interface allows for  
Should read:  
conjunction with the graphical user interface allows for Signed and Sealed this  
Second Day of October, 2018

Andrei Iancu  
*Director of the United States Patent and Trademark Office*